United States Patent [19]

Komada et al.

[11] 4,438,444

[45] Mar. 20, 1984

[54] MULTI-STYLUS HEAD

[75] Inventors: Kenya Komada, Yokohama; Yui-Kuan Tan, Sagamihara, both of Japan

[73] Assignee: Ricoh Company, Ltd., Tokyo, Japan

[21] Appl. No.: 208,261

[22] Filed: Nov. 19, 1980

[30] Foreign Application Priority Data

Nov. 20, 1979 [JP] Japan ............................ 54-151271

[51] Int. Cl.[3] ........................................ G01D 15/06

[52] U.S. Cl. .................................. 346/155; 346/154

[58] Field of Search .......................... 346/154–156, 346/165, 139 R, 139 C

[56] References Cited

U.S. PATENT DOCUMENTS 3,653,065 3/1972 Brown, Jr. ........................ 346/154

3,792,495 2/1974 Bliss et al. ........................ 346/154

4,262,294 4/1981 Hara et al. ........................ 346/154

*Primary Examiner*—Thomas H. Tarcza

*Attorney, Agent, or Firm*—Oblon, Fisher, Spivak, McClelland & Maier

[57] ABSTRACT

A multi-stylus head comprising a plurality of segmented electrodes aligned in at least one row and multiple styli aligned in a row and grouped corresponding to the segmented electrodes. The multi-stylus head is capable of forming electrostatic latent images on a dielectric layer of a recording material by applying a voltage to the segmented electrodes and the multiple styli. In order to prevent the image density of the electrostatic latent images from becoming uneven in the direction normal to the recording scanning direction, the grouped multiple styli are shifted relative to the segmented electrodes in the direction of the recording scanning direction.

4 Claims, 9 Drawing Figures

MULTI-STYLUS HEAD

BACKGROUND OF THE INVENTION

The present invention relates to a multi-stylus head comprising fine multi-stylus electrodes arranged in a row of a plurality of rows, which is employed for forming electrostatic latent images in an image recording apparatus.

Referring to FIG. 1, there is perspectively shown a conventional multi-stylus head of the above-mentioned type which is described in U.S. Pat. No. 3,653,065. In the figure, a head 1 comprises stylus electrodes 2 arranged in a row with 8 styli per mm. The alignment of the styli starts from the central portion between two segmented electrodes $3_{11}$ and $3_{21}$. The segmented electrodes $3_{11}\sim 3_{1(2n+1)}$ and the segmented electrodes $3_{21}\sim 3_{2(2n+1)}$ are aligned on both sides of the aligned styli, with their centers 6 mm apart. The segmented electrode pairs ($3_{11}$ and $3_{21}$) and ($3_{2(2n+1)}$), which are disposed on both sides of the styli, are connected to each other. There are disposed 2048 styli in total, which are grouped with each group consisting of 48 styli. Therefore, one group of styli is positioned between the respective centers of the two adjacent segmented electrodes. The groups of the styli can be classified into odd number groups $SG_1$, $SG_3$, . . . , $SG_{2n-1}$, and even number groups $SG_2$, $SG_4$, . . . , $SG_{2n}$. The styli at the corresponding positions in the odd number groups are connected to each other, while the styli at the corresponding positions in the even number groups are connected to each other. Therefore, when a voltage is applied to one common connection wire, the same voltage is applied to all the styli connected to that connection wire. The value of the voltage applied to the styli is such that electrostatic images are not formed by the voltage. When a voltage with an opposite polarity to that of the above-mentioned voltage is applied to the segmented electrodes, an electrostatic latent image is formed. Thus, latent image formation is performed successively in each group of the styli from one end of the stylus electrode 2 to the other end thereof. A dielectric layer of an electrostatic recording paper is brought into pressure contact with the recording end surface of the head 1.

The timing of application of the voltage to each segmented electrode and the timing of application of the voltage to each group of the styli in accordance with the image signals are set as shown in FIG. 2. When developing the electrostatic latent image thus formed, it may occur that the image density becomes uneven in vertically-striped patterns as shown in FIG. 3. The vertically-striped patterns are considered to be formed for the following reason: When recording is started from the stylus group $SG_1$, voltages are applied to the stylus group $SG_1$ and the segmented electrodes $3_{11}$, $3_{12}$, $3_{21}$ and $3_{22}$. An equivalent circuit in that case is shown in FIG. 4. When the voltage $V_{st}$ (multi-stylus application voltage) and $V_{se}$ (segmented electrode application voltage) are applied, a charge current flows as shown in FIG. 5. However, the electrostatic capacity of a capacitor $C_g$ in the stylus gap between the stylus $2_i$ and the dielectric layer DL is extremely small compared with the electostatic capacity of a capacitor $C_{se1}$ between the segmented electrodes $3_{11}$ and $3_{12}$, and the conductive layer CL, and compared with the electrostatic capacity of a capacitor $C_{st}$ of the dielectric layer DL below the stylus gap. Therefore, the voltage $V_{st}+V_{se}$ is mostly applied to the stylus gap, so that dielectric breakdown and discharging take place in the stylus gap. At that moment, since the resistivity of the conductive layer CL, that is, the value of a resistor $R_{po}$, is far smaller than those of the capacitors $R_{p1}$ and $R_{p2}$, most of the discharge current is the charged current of the electrostatic capacities $C_{se1}$ and $C_{se2}$. When the voltage has been applied, the stylus $2_i$ and the segmented electrodes $3_{11}$, $3_{21}$, $3_{12}$ and $3_{22}$ are grounded. As a result, the charges of the capacitors $C_{se1}$ and $C_{se2}$ are discharged through the resistor $R_{po}$ as shown in FIG. 6. However, the charges of the capacitor $C_{st}$, that is, the charges of the dielectric layer DL, are not discharged, since the insulating properties of the stylus gap have been restored, whereby a latent electrostatic image LI is formed. Generally, the grounded position of the conductive layer CL is located away from the head 1, and, furthermore, the resistivity of the conductive layer CL is so high that the discharging of the capacitor $C_{se2}$ through the resistor $R_{po}$ has not been completed when recording is performed by applying a voltage to the styli of the second stylus group $SG_2$. Therefore, when the voltage is applied to the styli of the second stylus group $SG_2$ and to the segmented electrodes $3_{12}$, $3_{22}$, $3_{13}$ and $3_{23}$, the value of the charge current of the multi-stylus on the side of the segmented electrodes $3_{12}$ and $3_{22}$ is decreased due to the effect of the residual charges of $C_{se2}$. Accordingly, the charges for forming the latent electrostatic image LI are reduced and the image density of the recorded image is also reduced. As a result, the recording image density becomes less on the recording start side of the multi-stylus in each stylus group following the second stylus group $SG_2$, so that the vertically-striped patterns appear as shown in FIG. 3.

Therefore, in order to prevent the occurrence of such vertically-striped patterns, a recording method of energizing the stylus groups alternately, for instance, energizing $SG_1$, $SG_3$, $SG_5$, . . . ; and $SG_2$, $SG_4$, $SG_6$, . . . , is proposed in Japanese Laid-open Patent Application No. 136832/1978. According to this method, recording is performed by alternative use of the stylus groups, $SG_1$, $SG_3$, $SG_5$, . . . , and therefore when recording is performed by use of their adjacent stylus groups, $SG_2$, $SG_4$, $SG_6$, . . . , the capacitors $C_{se1}$ and $C_{se2}$ have been completely discharged, so that the image density does not become uneven. However, generally, the recording sheet is continuously fed during the recording operation at a predetermined speed. Therefore, when recording is performed by use of the stylus groups $SG_1\sim SG_{2n-1}$ and then recording is performed by use of the stylus groups $SG_2\sim SG_{2n}$, there may occur some shift or steps in position between the recording by the odd number stylus groups, $SG_1\sim SG_{2n-1}$, and the recording by the even number stylus groups, $SG_2\sim SG_{2n}$, which may degrade the image density.

SUMMARY OF THE INVENTION

It is therefore an object of the present invention to provide a multi-stylus head for electrostatic recording which is capable of preventing the image density from becoming uneven by energizing successively each group of the multiple styli.

In order to attain the above-mentioned object of the present invention, the arrangement of the groups of the multiple styli is shifted relative to the arrangement of the segmented electrodes in the recording scanning direction with respect to the grouped styli, and the number of the styli out of all the styli in a certain group, which may be affected by the residual charges of the dielectric layer which are generated by the recording energization of the previous multi-stylus groups.

In this case, the greater the shifted distance of the multi-stylus electrodes from one end thereof, the smaller the number of the styli in the groups which may be affected by the residual charges, with the result that the number of the styli to be shifted to the other end of the multi-stylus electrodes increases. The styli shifted to the other end of the multi-stylus electrodes are located near the segmented electrodes which are not used for recording energization of the grouped styli, and the segmented electrodes are grounded when a voltage is not applied thereto. Therefore, the shunt current to be grounded from the segmented electrodes increases, so that the voltage to be applied to the other end portion of the stylus electrodes is reduced and the discharging therefrom is also reduced. Therefore, at this point, there is a limitation to the shifted distance of the stylus electrodes relative to the segmented electrodes in the energizing of the grouped multi-stylus electrodes. Therefore, in the present invention, in order to make the recording image density as constant as possible by the grouped stylus electrodes, the stylus electrodes are shifted relative to the segmented electrodes within the above-mentioned limitation.

DETAILED DESCRIPTION OF THE PREFERRED EMBODIMENT

Figure 1:
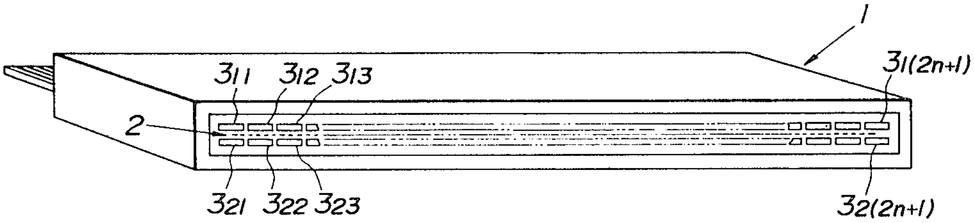
FIG. 1 Prior Art
FIG. 1 is a perspective view of a conventional multi-stylus head.
Figure 2:
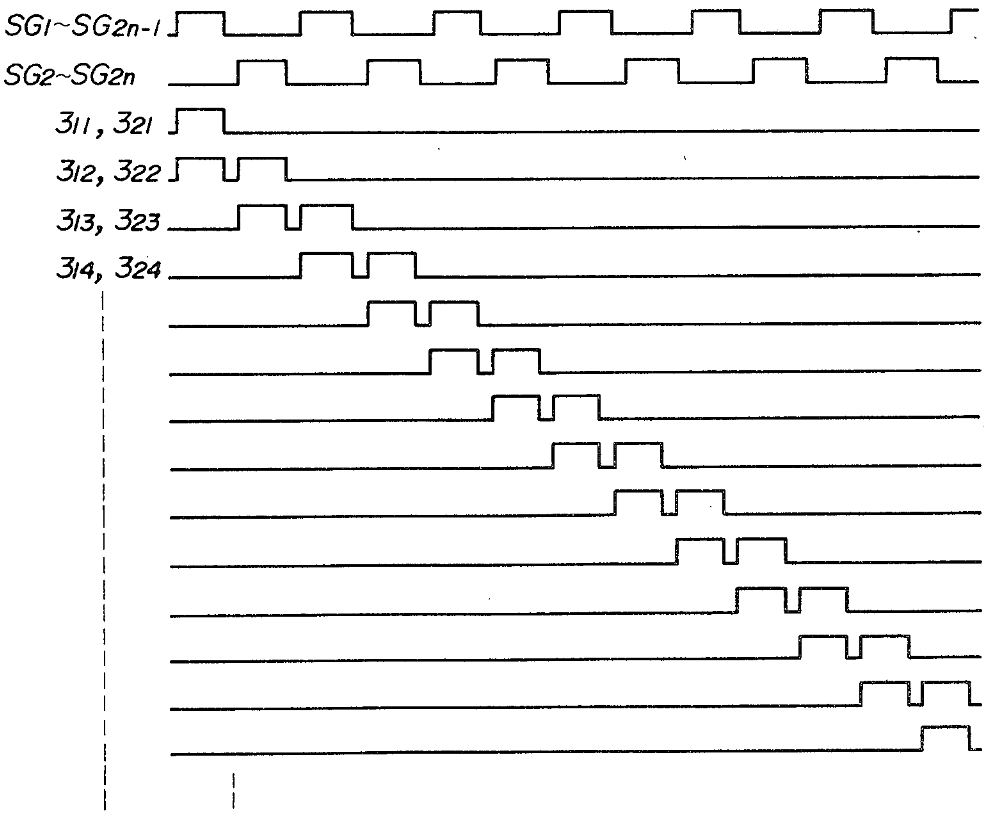
FIG. 2 is a time chart showing the timing of recording energization of the multi-stylus head in FIG. 1.
Figure 3:
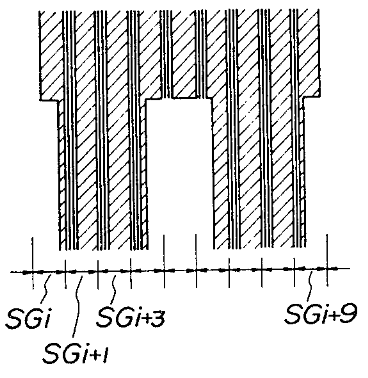
FIG. 3 is an enlarged plan view of a recorded image formed by the conventional multi-stylus head in FIG. 1.
Figure 4:
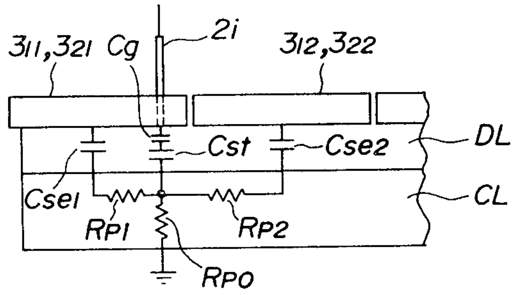
FIG. 4 is the circuit diagram of an equivalent circuit of the conventional multi-stylus head in FIG. 1.
Figure 5:
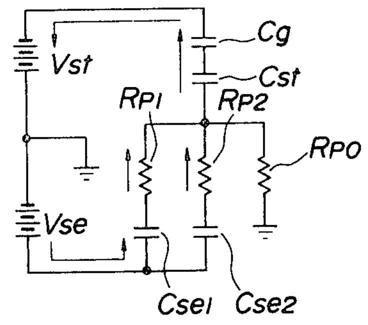
FIG. 5 is a circuit diagram of the equivalent circuit in FIG. 4, when a recording voltage is applied to a group of styli in the conventional multi-stylus head in FIG. 1.
Figure 6:
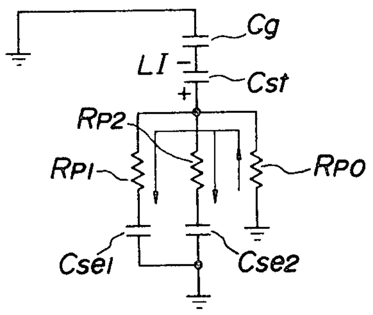
FIG. 6 is a circuit diagram of the equivalent circuit in FIG. 4, when application of the voltage is stopped.
Figure 7:
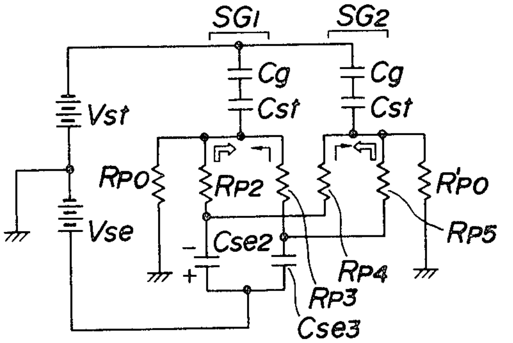
FIG. 7 is a circuit diagram of the equivalent circuit in FIG. 4, when a recording voltage is applied to another group of styli in the conventional multi-stylus head in FIG. 1.
Figure 8:
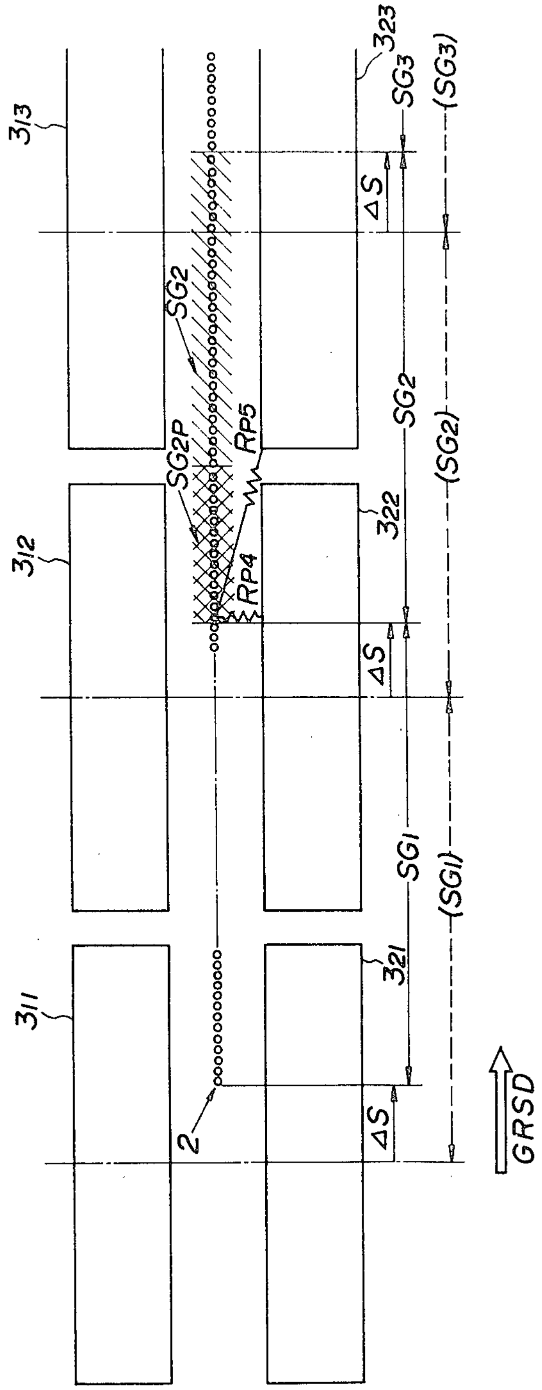
FIG. 8 is an enlarged plan view of the recording end portion of an embodiment of a multi-stylus head according to the present invention.
Figure 9:
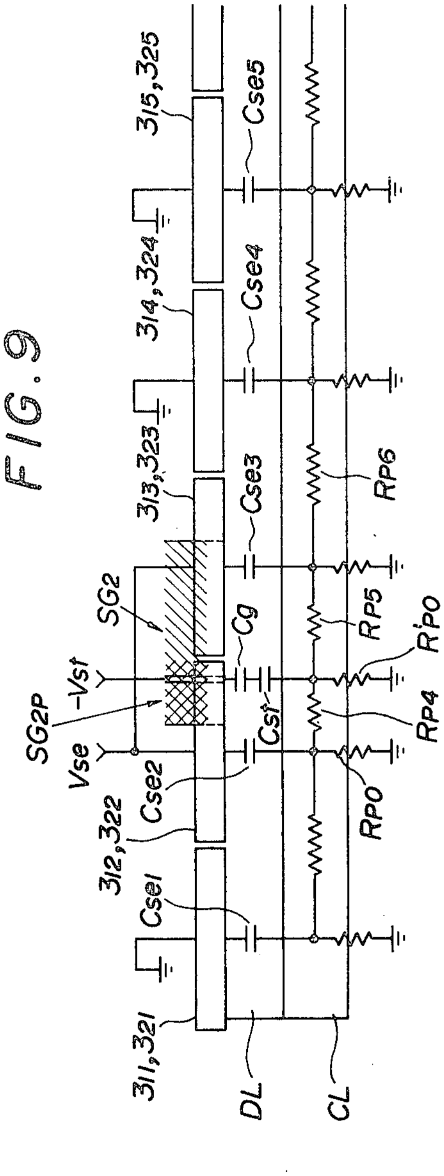
FIG. 9 is a circuit diagram of the equivalent circuit of the multi-stylus head in FIG. 8.

Referring to FIG. 8 and FIG. 9, an embodiment of a multi-stylus head according to the present invention will now be explained.

FIG. 8 shows part of the recording end surface of the multi-stylus head of a one-side recording type, in which the stylus electrodes 2 are shifted relative to segmented electrodes $3_{11}$, $3_{21}$, $3_{12}$, $3_{13}$, $3_{23}$, . . . in the recording scanning direction of the grouped styli, GRSD. Furthermore, in the figure, $SG_1$, $SG_2$, $SG_3$, . . . designate the groups of styli shifted according to the present invention, while $[SG_1]$, $[SG_2]$, $[SG_3]$, . . . designate the groups of styli in a conventional multi-stylus head.

FIG. 9 shows a circuit diagram of an equivalent circuit of the multi-stylus head in FIG. 8.

In this embodiment, an electrostatic latent image is formed by the group of styli, $SG_1$, by applying a voltage $-V_{st}$ to each of the styli in the group $SG_1$ in accordance with an image signal, while applying a voltage $+V_{se}$ to the segmented electrodes $3_{11}$ and $3_{21}$, and $3_{12}$ and $3_{22}$. At this moment, a capacitor $C_{se1}$ between the segmented electrodes $3_{11}$ and $3_{21}$, and a conductive layer CL of a recording sheet, and a capacitor $C_{se2}$ between the segmented electrodes $3_{21}$ and $3_{22}$, and the conductive layer CL of the recording sheet, are changed, so that upon stopping of the application of the voltages, discharging of the two capacitors $C_{se1}$ and $C_{se2}$ starts through a resistor of the conductive layer CL. When a voltage $+V_{se}$ is then applied to the segmented electrodes $3_{12}$, $3_{22}$, $3_{13}$ and $3_{23}$ and a voltage $-V_{st}$ is applied in accordance with an image signal to the styli in the group $SG_2$, the capacitor $C_{se2}$ is not completely discharged, as mentioned previously. In the current loop connecting the gas ($C_g$) of the styli in the stylus electrode group $SG_{2p}$ near the segmented electrodes $3_{12}$ and $3_{22}$, to which the voltage $-V_{st}$ is applied to the capacitor $C_{se2}$, the charging current value is small, so that the voltage applied to the gap $C_g$ decreases. However, the number of styli in the stylus electrodes $SG_{2p}$ is smaller than that in the conventional stylus electrodes, that is, $SG_{2p}=\frac{1}{2}SG_2$, and those styli are arranged more closely in the direction of the segmented electrodes $3_{12}$ and $3_{23}$. Therefore, the charging current of the capacitor $C_{se2}$ distributed to each stylus is greater than that in the conventional multi-stylus head. Furthermore, in the loop of $C_g$-$C_{st}$-$R_{p5}$-$C_{se3}$, the resistance $R_{p4}$ within the conductive layer CL between the stylus group $SG_{2p}$ and the segmented electrodes $3_{13}$ and $3_{23}$ is smaller with respect to the whole stylus group $SG_{2p}$ than the conventional resistance. Therefore, the voltage and current applied through an uncharged capacitor $C_{se3}$ are greater than in the case of the conventional multi-stylus head. Therefore, even if charges remain in the capacitor $C_{se3}$, recording of images can be performed with a comparatively high image density. In other words, in the conventional multi-stylus head, the shifted position DS is greatly affected by the residual charges of the capacitor $C_{se2}$. However, in the present invention, no styli are disposed in that shifted portion S. The number of the styli assigned to the capacitor $C_{se2}$ is correspondingly reduced. This will now be explained in more detail. When a voltage is applied to the segmented electrodes $3_{11}$, $3_{21}$, $3_{12}$, $3_{22}$ and the styli of the stylus group $SG_1$ for a period of time, $t_{on}$, and the capacitor $C_{se2}$ is completely charged, that is, $R_{p1}Cst<<ton$, the following relationship exists between the charges $Q_{se2}$ charged in the capacitor $C_{se2}$ and the charges $Q_{st}$ charged in the capacitor $C_{st}$:

$$Q_{se2} \approx \tfrac{1}{2}SG_1 Q_{st} \quad (1)$$

where, $\frac{1}{2}SG_1$ is one-half of the number of the styli in one stylus group.

In the case where the stylus electrodes are shifted by $\Delta S$ (x styli), $$Q_{se2} \approx (\tfrac{1}{2}SG_1 + x)Q_{st} \quad (2)$$

Furthermore, since $C_{st}<<C_{se1}$, $C_{se2}$, $C_{se3}$, $Q_{st}$ is given by the following equation (3):

$$Q_{st} \approx C_{st}(V_{se} + V_{st}) \quad (3)$$

In this case, the voltage $V_{se2}$ across the capacitor $C_{se2}$ is $$V_{se2}=Q_{se2}/C_{se2}. \quad (4)$$

When the application of the voltage is completed and no voltage is applied for a period of time, $t_{off}$, the capacitor $C_{se2}$ begins to discharge through the resistor $R_{po}$. At this moment, the voltage $V_{se2}(t)$ across the capacitor $C_{se2}$ is given by $$V_{se2}(t)=Q_{se2}\cdot exp(-t/C_{se2}R_{po}) \quad (5)$$

$V_{se2}(t)$ at the time of applying the voltage to the styli in the stylus group $SG_2$ in the period of time, $t_{off}$, can be obtained by instituting the value of $t_{off}$ into the equation (5).

With respect to the stylus at the left end of the stylus group $SG_2$ and to the segmented electrodes $3_{12}$, $3_{22}$, $3_{13}$ and $3_{23}$, if $$V_{se2}(t_{off})\geqq(R_{p5}/R_{po}')V_{se} \quad (6)$$

the effect of the residual charges of the capacitor $C_{se2}$ on the charging of the capacitor $C_{st}$ for electrostatic latent image formation can be reduced.

From Equations (1) to (5), $$V_{se2}(t_{off}) = \frac{C_{st}(V_{se}+V_{st})(\frac{1}{2}SG_1+x)}{C_{se2}}\exp\left(\frac{-t_{off}}{C_{se2}R_{po}}\right) \quad (7)$$

From Equations (6) and (7), $$\frac{C_{st}(V_{se}+V_{st})(\frac{1}{2}SG_1+x)}{C_{se2}}\exp\left(\frac{-t_{off}}{C_{se2}R_{po}}\right) \leqq (R_{p5}/R'_{po})V_{se} \quad (8)$$

Hence $$\frac{(\frac{1}{2}SG_1+x)}{R_{p5}} \leqq \frac{V_{se}\cdot C_{se2}}{R'_{po}C_{st}(V_{se}+V_{st})\exp(-t_{off}/C_{se2}R_{po})} \quad (9)$$

where $R_{p5}$ is the resistance of the conductive layer between the stylus at the left end of the second stylus group $SG_2$ and the segmented electrodes $3_{12}$ and $3_{22}$. Therefore, $R_{p5}$ is a function of x. However, this is so complex that the respective resistances $R_{p5}$, when X=1, 2, 3, . . . $\frac{1}{2}SG_1$, are measured and those respective resistances are substituted into Equation (9); the value x which satisfies Equation (9) is obtained; and, in accordance with the thus obtained value x, the stylus electrodes are shifted relative to the segmented electrodes. In the case of a multi-stylus head with 8 styli per mm and 48 styli in each of the stylus groups $SG_1$ and $SG_{2n}$ and with $t_{off}$=30, μsec, Equation (9) can be satisfied when $x\geqq 8$ and $\Delta S\geqq 1$ mm.

Thus, by shifting the stylus electrodes relative to the segmented electrodes in the stylus group scanning direction GRSD for recording, the recorded image density to be obtained by the stylus $SG_{2p}$ at the left end of the stylus electrodes can be improved as depicted in FIG. 8. However, when a voltage $-V_{st}$ is applied to the styli in the stylus group $SG_1$ for recording, the adjacent segmented electrodes are grounded. However, the stylus shifted by ΔS at the right end of the segmented electrode group $SG_2$ is located closer to the segmented electrodes $3_{14}$ and $3_{24}$ by ΔS than in the case of the conventional multi-stylus head. As a result, the resistance $R_{p6}$ of the conductive layer, which is connected to the gap of the stylus and the D.C. current loop of the capacitor $C_{st}$ and the grounded capacitor $C_{se4}$ below the segmented electrodes $3_{14}$ and $3_{24}$, is smaller than that in the conventional multi-stylus head. Therefore, the voltage and current to be applied to the gap of the stylus are more distributed to the capacitor $C_{se4}$ through the resistor $R_{p6}$.

When the shifted distance is great and the distribution ratio of the voltae and current is also great, no discharging may take place or the image density may be reduced due to the insufficient discharging current.

As the stylus electrodes are shifted gradually relative to the segmented electrodes to the right in FIG. 8, the image density on the left side in each stylus group is gradually increased, while the image density on the right side in each stylus group is gradually decreased. When such shifting is not done, the image density on the left side in each stylus group is low, while the image density on the right side in each stylus group is high. As a result, the vertically-striped patterns become conspicuous. However, by the above-mentioned shifting, the difference in image density between the left side and the right side of each stylus group can be reduced, and when the image density on both sides become almost equal, the above-mentioned vertically-striped patterns disappear. Therefore, the stylus electrodes are shifted relative to the segmented electrodes until the vertically-striped patterns disappear or the image density on both sides of each stylus group becomes substantially equal.

According to the experiments conducted by the inventors of the present invention, in the case of a multi-stylus head with 8 styli per mm, each group of the styli consisting of 48 styli, when the stylus electrodes are shifted relative to the segmented electrodes by 1 mm (which corresponds to the alignment length of 8 styli), the unevenness in image density was minimized, and by shifting the stylus electrodes relative to the segmented electrodes in the range of 0.5 to 2.0 mm (which corresponds to the alignment length of 4 to 16 styli), the unevenness in image density can be improved to the extent that it can be acceptable for practical use.

As mentioned above, according to the present invention, improvement of the unevenness is recorded image density can be done by shifting the stylus electrodes relative to the segmented electrodes in the stylus group scanning direction for recording, without making other mechanical modifications, or modifications for the control thereof.

In the above, the application of the present invention to a one-side recording type multi-stylus head is explained. However, the present invention can be applied to a two-side recording type multi-stylus head in which the stylus electrodes and the segmented electrodes can be separately disposed so as to hold a record sheet therebetween, in order to prevent the formation of the vertically-striped patterns in the recorded images as mentioned above.

What is claimed is:

1. In an electrographic recording multi-stylus head having a plurality of styli aligned in at least one row and divided into plural groups, and a plurality of segmented electrodes aligned in at lest one row, each of said groups of styli corresponding to a respective at least two of said segmented electrodes, wherein said groups of styli and said segmented electrodes are adapted to form an electrostatic image on a surface of a dielectric layer of a recording material by applying a voltage between the styli in each of the groups of said styli and the respective at least two segmented electrodes, the improvement comprising:

each group of styli having a leading end stylus and a trailing end stylus arranged in a recording and scanning direction, wherein the leading and trailing end styli of each stylus group are each spaced apart in a same predetermined direction from the centers of the respective at least two segmented electrodes corresponding thereto by a predetermined distance (ΔS) such that each stylus group is offset in said predetermined direction relative to said centers of said respective segmented electrodes by said predetermined distance.

2. An electrographic recording multi-stylus head as claimed in claim 1, wherein said predetermined distance is determined such that the recording image density is substantially the same at both leading and trailing end styli in each of the groups of styli.

3. An electrographic recording multi-stylus head as claimed in claim 1, wherein said styli are arranged at a density of 8 styli per mm and the predetermined distance is in the range of 0.5 to 2.0 mm.

4. An electrographic recording multi-stylus head as claimed in claim 1, wherein the predetermined distance is 1 mm.

* * * * *